United States Patent
Esswie

(10) Patent No.: US 12,238,547 B2
(45) Date of Patent: Feb. 25, 2025

(54) CROSS LINK INTERFERENCE MEASUREMENT IN A TIME DIVISION DUPLEXING RADIO ACCESS NETWORK SYSTEM

(71) Applicant: Dell Products, L.P., Round Rock, TX (US)

(72) Inventor: Ali Esswie, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 425 days.

(21) Appl. No.: 17/892,095

(22) Filed: Aug. 21, 2022

(65) Prior Publication Data
US 2024/0064539 A1 Feb. 22, 2024

(51) Int. Cl.
  *H04W 24/10* (2009.01)
  *H04W 24/06* (2009.01)
(52) U.S. Cl.
  CPC .......... *H04W 24/06* (2013.01); *H04W 24/10* (2013.01)
(58) Field of Classification Search
  CPC .............................. H04W 24/06; H04W 24/10
  See application file for complete search history.

(56) References Cited

U.S. PATENT DOCUMENTS

2022/0006501 A1* 1/2022 Kim ...................... H04W 24/10
2023/0189382 A1* 6/2023 Haustein ............... H04W 76/20
                                                       370/329

OTHER PUBLICATIONS

Technical specifications (TS) 38.300—"5G; NR; NR and NG-RAN Overall description; Stage-2" 3GPP TS 38.300 version 16.4.0 Release 16, Jan. 2021, 151 pages.
Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

* cited by examiner

*Primary Examiner* — Chuong A Ngo
(74) *Attorney, Agent, or Firm* — Amin, Turocy & Watson, LLP

(57) ABSTRACT

A victim RAN node subject to cross-link interference ("CLI") from a neighboring aggressor RAN node requests a CLI measurement procedure with the aggressor. The CLI measurement request may include indication of time-unit and frequency resources, and uplink and downlink beam combinations, corresponding to the victim and aggressor, respectively, to be used during the measuring procedure. Upon acknowledgement by the aggressor to participate in measuring CLI according to resource information indicated in the request, the victim may mute ongoing receiving or transmitting of signals using the time, frequency, and beam-combination resources indicated in the request and measure CLI received from the aggressor during the time, at the frequencies, and via the beam-combinations indicated in the request. The victim RAN may compile a CLI measurement report and transmit the report to the aggressor. The request, acknowledgement, and report may be transmitted via backhaul links.

20 Claims, 13 Drawing Sheets

FIG. 13

- CLI cell-specific measurement priority

- CLI measurement frequency and timing resources: the explicitly timing and frequency resources for CLI measurements and/or if configured, a CLI measurement resource pattern indication.

- CLI beam switching pattern: including multiple information objects, where each indicates a (resource element, Tx beam index, Rx beam index, type of CLI reference signal).

1305

- CLI measurement report based on CLI coverage: including multiple information objects, where each indicates a (CLI resource element and/or index, CLI-RSRP) and/or (CLI resource element and/or index, CLI-RSSI).

1310

CROSS LINK INTERFERENCE MEASUREMENT IN A TIME DIVISION DUPLEXING RADIO ACCESS NETWORK SYSTEM

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Dynamic Time division duplexing ("TDD") is a promising technology for Fifth Generation ("5G") NR and future wireless systems beyond 5G. Dynamic TDD offers greater performance merits than conventional frequency division duplexing ("FDD"), including utilizing channel reciprocity, reduced device-to-network signaling overhead, and dynamic adaptation of the network resources to the asymmetric downlink and uplink arrivals. However, fulfilling stringent latency and reliability performance targets in dynamic TDD networks is challenging, due to the exclusive availability of either a downlink or uplink transmission at a time. That is, unlike FDD, simultaneous uplink and downlink transmissions at the same frequency do not typically occur, which can lead to additional payload buffering delays. Full duplexing is a technology that may assign sub-bands of a bandwidth for different transmission directions. For example, within a TDD downlink slot or subframe, part of the bandwidth may be allocated to uplink transmissions, for example to carry device uplink feedback corresponding to received downlink transmissions during the TDD downlink slot, thus removing the waiting or buffering delay associated with waiting until a next uplink TDD slot to transmit the uplink feedback. However, implementing full duplex presents a problem of cross-link interference ("CLI"), which may occur due to the neighboring RAN nodes adopting opposite transmission directions (e.g., uplink vs. downlink) at the same time, over certain spectrum sub-bands. Such RAN-node-to-RAN-node CLI caused by downlink transmission from one RAN node has been demonstrated to severely impact uplink transmission to adjacent RAN nodes due to the significantly higher downlink power than uplink transmission power from a user equipment. Therefore, solutions for dynamically measuring and determining the strength of the severe CLI are desirable.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises transmitting, from a second node of a second radio access network (RAN) to a first node of a first RAN, a request indicating cross link interference measurement parameter information corresponding to the first RAN. The second node may comprise a victim RAN node and the first node may comprise an aggressor RAN node. The victim RAN may be experiencing CLI during an uplink timing resource at a frequency, or using a frequency range, while the aggressor RAN is transmitting a downlink traffic portion at the same frequency, or frequency range. The request may comprise a request for the aggressor RAN node to participate in a measurement procedure with the victim RAN node, and the cross link interference measurement parameter information indicated in the request may comprise information to be used by, or to direct, the aggressor RAN in transmitting a reference signal, or test signal, used for the measurement procedure. An example of a reference signal may comprise a sounding reference signal ("SRS"). The example method embodiment may comprise receiving, from the first node, acknowledgement of the indicated cross link interference measurement parameter information—the acknowledgement may comprise indication of agreement by the aggressor RAN to participate in the requested CLI measurement procedure according to the indicated cross link interference measurement parameter information, or, instead of agreement to the cross link interference measurement parameter information indicated in the request, an acknowledgement may comprise a modification of the parameters indicated in the request if the aggressor RAN cannot participate in CLI measurement with the victim RAN according to all of the parameters included in the request. The example method may comprise detecting a cross link interference test signal (the phrase 'test signal' may be referred to herein as, or used interchangeably with, the phrase 'reference signal'), transmitted by the first node in a first transmit beam according to the cross link interference measurement parameter information indicated in the request, or indicated in an acknowledgement from the first node if the first node modified, in the acknowledgement, the cross link interference measurement parameter information indicated in the request; analyzing the cross link interference test signal with respect to the cross link interference measurement parameter information indicated in the request, or acknowledgement, to result in analyzed cross link interference test signal information; generating, by the second node, a cross link interference report based on a result of the analyzing of the cross link interference test signal information; and transmitting the cross link interference measurement report from the second node to the first node; wherein the request for the indicated cross link interference measurement parameter information and the cross link interference report are transmitted via at least one backhaul interface. The acknowledgment sent by the aggressor/first RAN may also be transmitted via the at least one backhaul link, or via a different backhaul link.

The cross-link interference measurement parameter information indicated in the CLI measurement request, a CLI measurement request, or the CLI measurement acknowledgement that may acknowledge the cross-link interference measurement parameter information indicated in the CLI measurement request, or that modifies the cross-link interference measurement parameter information indicated in the CLI measurement request, may comprise at least one of: at least one measurement time resource, at least one measurement frequency resource, at least one priority level, at least one transmit and receive beam grouping indication, or at least one cross link interference test signal type.

In an embodiment, the example method may further comprise muting, by the second node, a resource corresponding to one or more indicated, or acknowledged, cross link interference measurement parameter information during a test period for which the first node is configured to transmit the cross link interference test signal according to the indicated or acknowledged cross link interference measurement parameter information.

In an embodiment, the example method may further comprise receiving, from the first node, a first preamble signal comprising a first preamble corresponding to the first node; analyzing the first preamble signal with respect to configured location information corresponding to the first node to result in analyzed preamble signal information; determining, based on the analyzed preamble signal information, a first offset time corresponding to a first transmit delay between the first node and the second node; and transmitting the first offset time to the first node, via the backhaul interface, for use by the first node in transmitting the cross link interference test signal. A time stamp corresponding the transmitting of the test signal/reference signal may be used by the first node to determine the first offset time. The determining of the offset time may be part of a pre-training procedure that is performed before a CLI measurement procedure. The second node may provide the determined offset time to the first node for use by the first node in performing downlink transmission signals during a CLI measurement procedure.

The detecting, by the second node, of the cross link interference test signal transmitted by the first node in the first transmit beam may comprise detecting the cross link interference test signal in a first uplink beam and in a second uplink beam, wherein the cross link interference test signal is analyzed for the first uplink beam and for the second uplink beam, wherein the analyzed cross link interference test signal information comprises first analyzed cross link interference test signal information corresponding to analyzing the cross link interference test signal detected in the first uplink beam, and wherein the analyzed cross link interference test signal information comprises second analyzed cross link interference test signal information corresponding to analyzing the cross link interference test signal detected in the second uplink beam.

In an embodiment, the example method may further comprise detecting the cross link interference test signal transmitted by the first node in a second transmit beam according to the indicated cross link interference measurement parameter information, wherein the detecting, by the second node, of the cross link interference test signal transmitted by the first node in the second transmit beam comprises detecting the cross link interference test signal in at least a third uplink beam, wherein the cross link interference test signal is analyzed for at least the third uplink beam, and wherein the analyzed cross link interference test signal information further comprises third analyzed cross link interference test signal information corresponding to analyzing the cross link interference test signal detected in at least the third uplink beam.

In the example method embodiment, the detecting of the cross link interference test signal transmitted by the first node in the first transmit beam and the analyzing the cross link interference test signal to result in the analyzed cross link interference test signal information are performed for at least one of: at least one measurement time resource, at least one measurement frequency resource, at least one priority level, at least one transmit and receive beam grouping indication, or at least one cross link interference test signal type.

In an embodiment, the example method may further comprise determining, by the second node, a priority level based on a mapping of a full duplex sub-band pattern corresponding to the second node.

BRIEF DESCRIPTION OF THE DRAWINGS

FIG. 13 illustrates a chart of a CLI measurement request content embodiment and a chart of a CLI measurement report content embodiment.

DETAILED DESCRIPTION OF THE DRAWINGS

Figure 1:
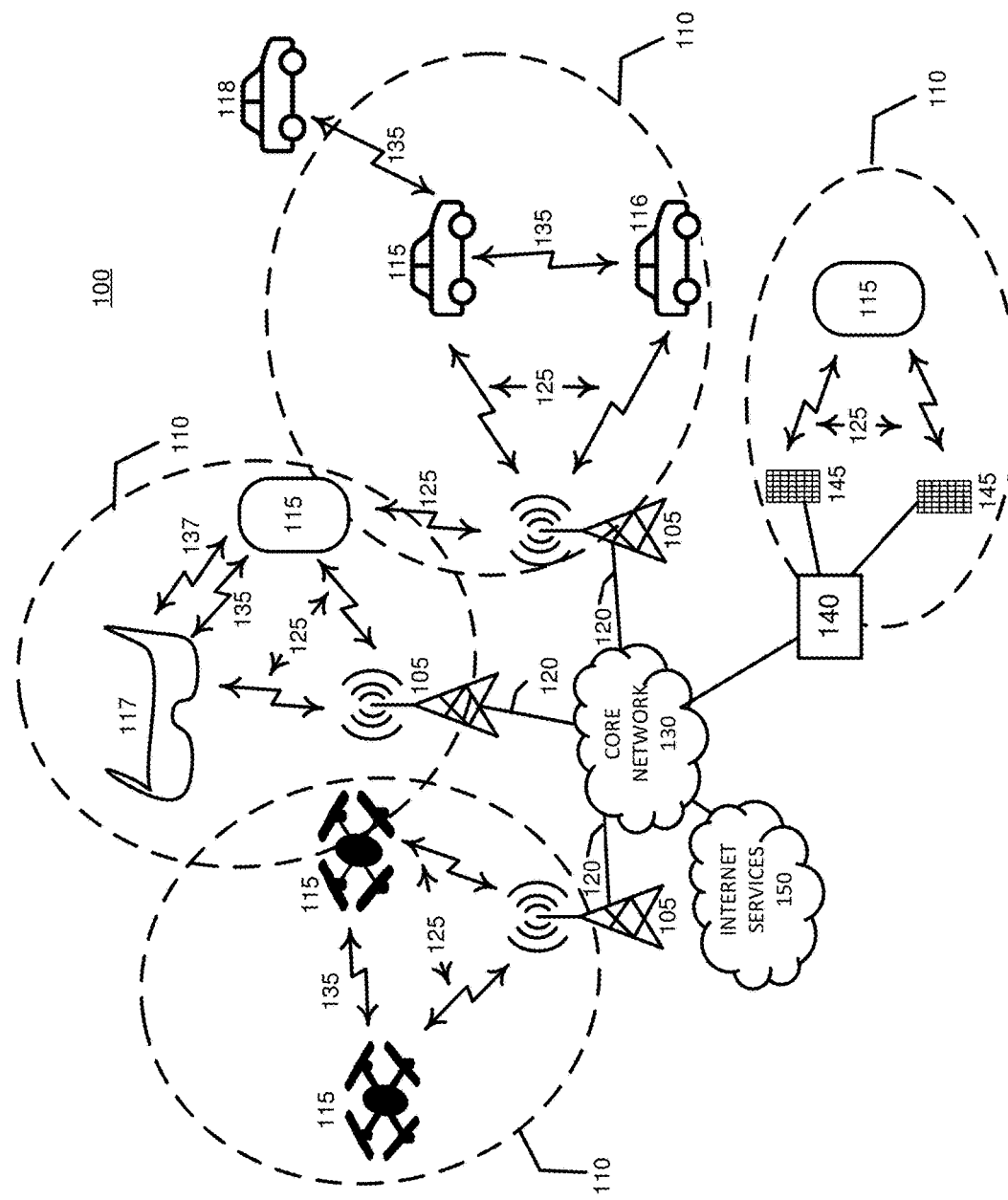
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
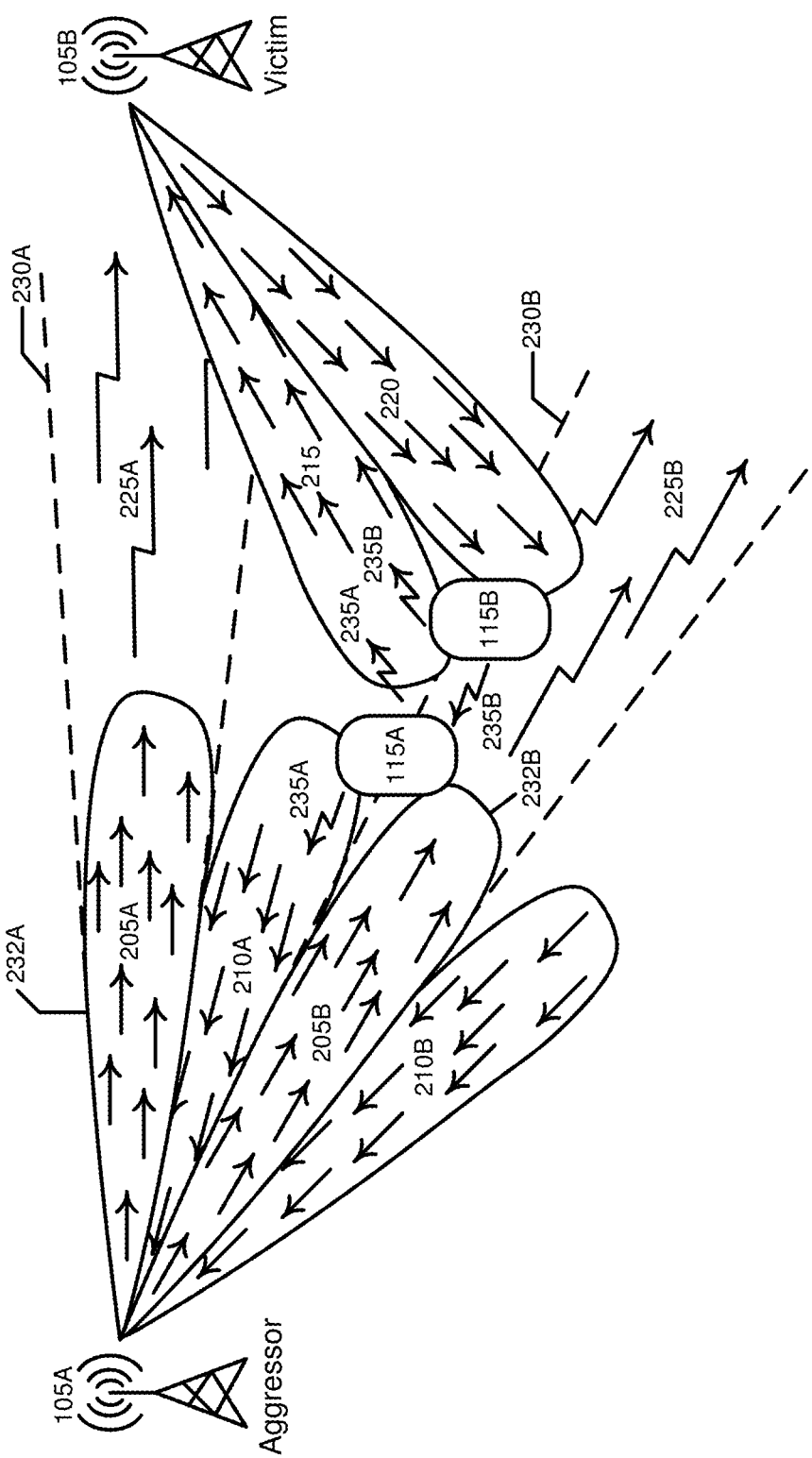
FIG. 2 illustrates an example multi-beam wireless user equipment environment.

Turning now to FIG. 2, the figure illustrates an example multi-beam wireless user equipment environment 200. Environment 200 shows RAN node 105A and RAN node 105B and UE 115A and UE 115B. UE 115A and UE 115B may be located at a signal coverage edge of either RAN 105A or RAN 105B. RAN 105A and RAN 105B may be geographically adjacent to one another insofar as a location of UE 115A and UE 115B may be at an edge of coverage of either RAN node. Thus, depending on various factors, such as a distance from UE 115A or UE 115B to either RAN 105A or RAN 105B, either UE may connect to either RAN. It will be appreciated that a UE may connect to one RAN for uplink traffic and to the other RAN for downlink traffic if the UE comprises multiple SIMs or multiple RF trains (e.g., multiple sets of separately tunable radio frequency circuitry).

Figure 4:
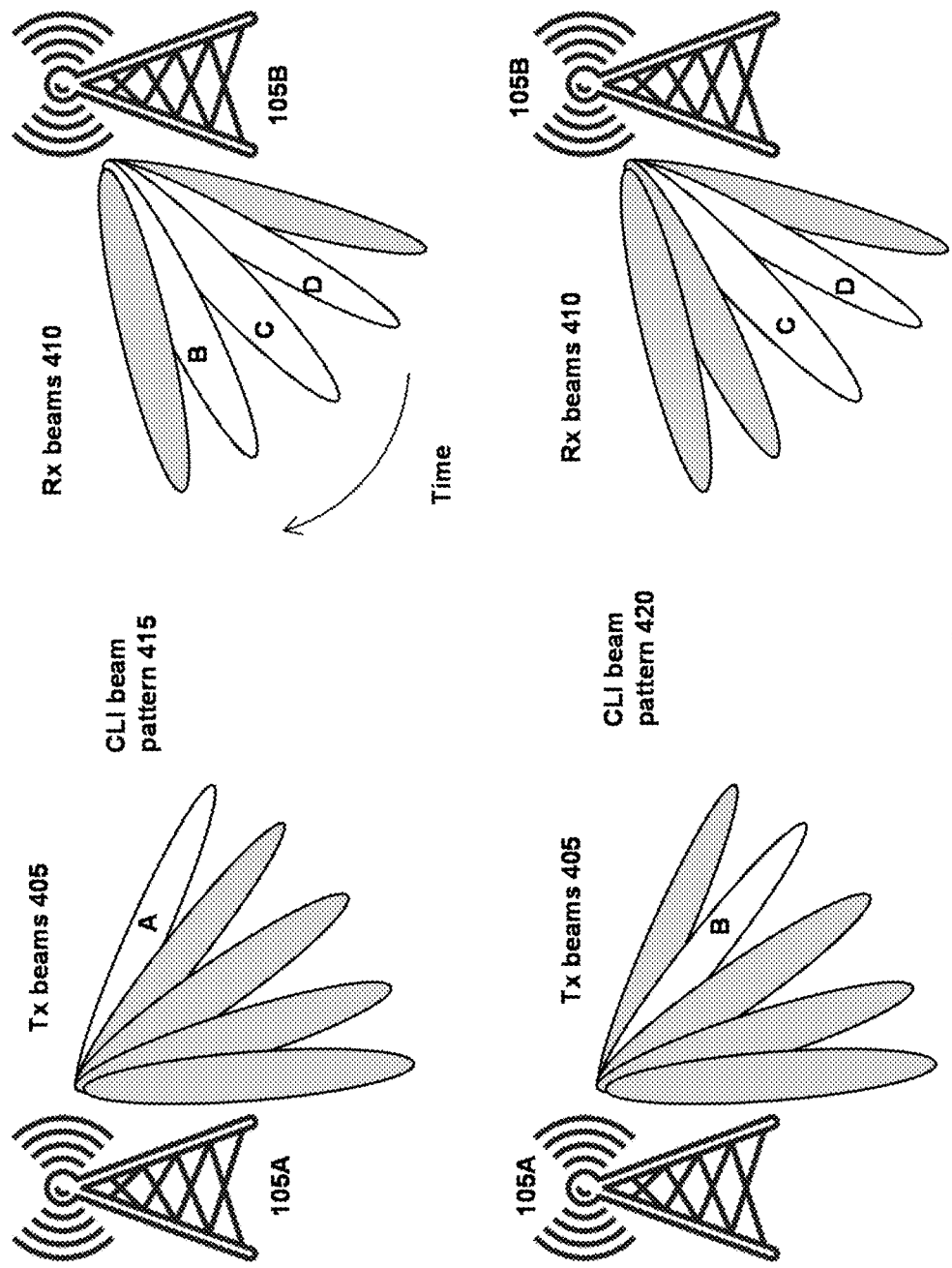
FIG. 4 illustrates a beam pattern switching cross link interference measurement embodiment.

RAN 105A may use multiple downlink beams, shown as downlink beam 205A and downlink beam 205B, to deliver downlink traffic to a user equipment and RAN 105A may use multiple uplink beams 210A and 210B, shown as uplink beam 210A and uplink beam 210B. It will be appreciated that a downlink beam may be associated with not only geographical, or spatial, dispersion of downlink signal energy from a RAN, but signal energy in a downlink beam may also be transmitted according to an associated frequency resource. For a given geographical/spatial dispersion pattern, a RAN may transmit multiple beams simultaneously if the RAN comprises multiple RF transmitter chains. Similarly, an uplink channel may be associated with a geographical/spatial sensitivity to uplink signal energy but may also be associated with a frequency at which an RF receiver circuit of the RAN is tuned to receive uplink traffic signal energy. Directional arrows inside of the beams shown in FIG. 2 correspond to traffic flowing in a downlink or uplink direction. Downlink beam 205A transmits signal energy 235A in a downlink direction; downlink signal energy is shown within beam cone 230A shown in broken lines to indicate that downlink signal energy may extend beyond a primary beam range of beam 205A indicated by beam lobe 232A, the outline of which is depicted as unbroken in the figure. Similarly, beam 205B transmits signal energy 235B in a downlink direction and downlink signal energy 235B may extend beyond beam lobe 232B. It will be appreciated that RAN 105A may facilitate more uplink and downlink beams than are shown in FIG. 2, but only two each of uplink and downlink beams corresponding to RAN 105A are shown for clarity in the figure. Furthermore, it will be appreciated that a downlink beam corresponding to RAN 105A may overlap partially, or completely, with an uplink beam, but the uplink and downlink beams corresponding to RAN 105A are shown in an alternating, or interleaved, fashion for clarity in FIG. 2. FIG. 4 described elsewhere herein shows downlink beams and uplink beams that are not necessarily interleaved.

Continuing with description of FIG. 2, assuming that UE 115A is connected to RAN 105A as indicated by UE 115A overlapping uplink beam lobe 210A and downlink beam lobe 205B, RAN 105A likely transmits downlink signal energy 225B to UE 115A via downlink beam 205B and RAN 105A likely receives uplink signal energy from UE 115A via uplink beam 210A. If UE 115A is not connected to RAN 105B, then even if UE 115A transmits uplink signal energy 235A that is receivable by RAN 105B via uplink beam 215 (e.g., the uplink signal energy is transmitted at a frequency and geographical, or spatial, sensitivity to which RAN 105B is tuned), RAN 105B may not monitor or decode the transmission from UE 115A because UE 115A is not connected to RAN 105B. RAN 105B may monitor or decode uplink signal energy 235B transmitted from UE 115B; uplink energy 235A transmitted by UE 115A typically will not pose a problem of interference or collision at RAN 105B even if UE 115A transmits during a period when RAN 105B is spatially sensitive to signals emanating within uplink beam 215 because UE 115A is not connected to RAN 105B and because the power of uplink energy 235A from UE 115A should be within a range that receiver circuitry at RAN 105B is designed to detect and decode, or to not decode.

However, if downlink energy 225A is transmitted in downlink beam 205A by RAN 105A during a period and at a frequency that RAN 105B is also using for detecting uplink signal energy according to uplink beam 215, uplink signal energy 235B may be overpowered and thus not detected, due to downlink energy from a RAN typically being more powerful than uplink signal energy transmitted from user equipment and also due to cone 230A spatially overlapping with spatial receiver sensitivity corresponding to uplink beam 215. Such overpowering of uplink detecting of one RAN by downlink signals of another RAN may be referred to a cross link interference. In FIG. 2, reference to RAN 105A as an 'Aggressor' RAN and reference to RAN 105B as a 'Victim' is not meant to assign a disparaging characterization to RAN 105A, but is merely meant to highlight that downlink signal energy transmitted from RAN 105A in beam 205A may cause interference during detecting of uplink signal energy in uplink spatial sensitivity corresponding to uplink beam 215 if the timing and frequency of the transmission of downlink energy 225A overlaps with a frequency and period that RAN 105B is simultaneously using to detect uplink traffic signal energy.

Several embodiments are disclosed herein to facilitate CLI measurement where the cell-to-cell CLI coverage and/or strength are dynamically measured and exchanged with adjacent RAN nodes along with cell-specific, or RAN-specific, timing advance, or timing offset, values that may be used to minimize CLI between adjacent RAN nodes. Embodiments disclosed herein may address paging energy efficiency and paging reachability delay for idle-mode or inactive-mode devices and may be applicable to wireless cellular network systems such as Third Generation Partnership Project ("3GPP") cellular networks and institute of Electrical and Electronics Engineers wireless systems.

Dynamic TDD systems offer greater performance advantages than conventional FDD networks. In a dynamic TDD system, each of multiple RAN nodes may be able to dynamically adapt TDD frame configurations depending on the amount of the available downlink and uplink traffic. A frame configuration may include indications of a number and placement of downlink and uplink Orthogonal Frequency Division Multiplexing ("OFDM") symbols within a given time slot or frame. For example, a RAN node, which may have larger downlink traffic to be transmitted to user equipment devices than uplink traffic to be received from user equipment, can dynamically tune its TDD frame configurations such that it adopts more downlink transmission opportunities, or occasions, (e.g., slots or subframes) than corresponding uplink opportunities to transmit the large amount of buffered downlink traffic. In other words, a RAN with a heavy load of traffic packets buffered for transmission to user equipment may select to use a downlink-heavy TDD frame configuration. Thus, the offered system capacity can be dynamically adapted to operate asymmetrically by transmitting during more configured downlink opportunities than receiving of uplink traffic during configured uplink time units (e.g., slots, frames, subframes, or other similar configured divisions of time).

However, unlike FDD network system, dynamic TDD systems are challenged by the fact that there is only a single transmission at a time. In other words, either a downlink transmission to a user equipment or an uplink transmission from a user equipment is allowed at a given time. This may lead to buffering delays. For example, a downlink packet that arrives within an uplink time slot and that is associated with a stringent radio latency budget may be buffered until a next available downlink transmission opportunity. Such buffering may cause a violation of a latency criterion corresponding to the buffered downlink packet. Full duplexing within dynamic TDD networks may facilitate reducing, or eliminating, of such buffering. In a full duplexing system, determined, or configured, spectrum sub-bands can be configured for carrying traffic in opposite direction than a configured direction for a current time slot. For example, an uplink time slot can be configured such that a RAN may that is otherwise receiving uplink traffic during the uplink time slot may nevertheless transmit downlink traffic via one or more dub-band frequencies. Therefore, buffering delay of dynamic TDD systems may be reduced or eliminated by overriding single-time single-direction transmission operation as normally occurs with TDD.

However, having adjacent RAN nodes with opposite transmission directions (e.g., uplink vs. downlink), either in the time or frequency domain, may result in CLI. CLI typically occurs in two varieties: device-to-device and Base Station-to-Base Station ("BS-to-BS") CLI. The 3GPP organization has determined that the BS-to-BS CLI is the most critical of the two varieties of CLI and can overpower, and thus block, uplink transmissions that would otherwise be reachable, or detectable by a RAN but for the CLI. This is due to the interfering Base Station ("BS") (e.g., RAN node) transmitting with a much larger transmission power than the useful uplink transmission power from a user equipment. CLI interference from one RAN may effectively overpower uplink transmissions to a neighboring RAN. Thus, BS-to-BS CLI measurement schemes that result in determining and reporting of CLI are desirable for dynamic TDD and full duplex deployments to be feasible and practical.

Dynamic TDD and full duplexing systems enable dynamic resource adaptation to varying and asymmetric traffic conditions in both downlink and uplink directions. This may lead to adjacent base-stations, (e.g., RAN nodes) attempting to perform traffic transmissions in opposite directions, either in time or frequency domains, at the same time. CLI may result and can be of two types: UE-UE CLI or BS-BS CLI depending on where the CLI is being experienced. BS-BS CLI has been determined to be more problematic with respect to dynamic TDD and full duplex systems due to the larger downlink interference power compared to the victim uplink transmissions. Embodiments disclosed herein are directed to addressing severe CLI within dynamic TDD and full duplexing systems.

Cross-Link Interference (CLI) Measurement.

A CLI channel may be dynamically measured by a RAN and a corresponding report may be exchanged across adjacent RANs, or cells. The phrase 'measuring a CLI channel' may refer to the gathering of signal parameter information corresponding to a signal, such as a test signal or reference signal, transmitted by a neighboring RAN during an agreed time, at an agreed frequency, and via an agreed downlink beam corresponding to the transmitting RAN and via an uplink beam corresponding to the measuring RAN. Neighboring RANs, or cells, may request CLI measurement from each other and may provide reports of measured CLI channel parameters with each other. A CLI measurement request may be sent among RANs via backhaul links and may include requests for information elements, or parameters, such as: resource set information that may comprise requests for information corresponding to timing and frequency resources to be used during measurement; an index of a CLI measurement resource set pattern that is associated with configured resource set information, from a list, table, database, or other similar format, of resource set patterns; a type of CLI measurement reference signal to be transmitted as a downlink signal, including CSI-RS, PTRS & DMRS; or a beam pattern, which may comprise indications of transmit and receive beam pair setting that may be used for CLI measurement for a multi-beam transmission measurement scenario. Signaling of a type of CLI measurement reference signal may be beneficial so that RANs, or cells, requesting measurement of CLI may potentially re-use an already-available reference signal being used for active users (e.g., transmission corresponding to user equipment that is/are not participating in the measuring of CLI and may be processing actual payload traffic packets) for the inter-cell CLI measurement thus reducing signaling and resource overhead of transmitting dedicated CLI measurement reference signals. Coordinating RANs, or cells, that are participating in a CLI measurement may mute the transmission of signals (other than reference signals used for testing) according to the CLI measurement resources agreed upon by the coordinating RANs so that receiving RANs can detect and measure transmitted CLI measurement reference signals without the signal's energy being bias by energy from other signals propagating at the same frequency and at the same time that may be carrying traffic that does not pertain to the CLI measuring. Thus, signal energy received by a coordinating RAN (e.g., coordinating and participating in a CLI measuring undertaking) via an uplink channel may be measured signal strength or corresponding CLI coverage (e.g., reference signal energy transmitted in a given transmit beam form one RAN being detected in an uplink beam of another RAN). RANs, or cells, that request CLI measurement may compile a CLI measurement report and exchange the report to adjacent cells, or RANs. The adjacent RANs may use reported CLI measurement values received from an adjacent RAN based on the fact that the CLI is likely semi-static and reciprocal (e.g., CLI will likely be the same for two beams of two respective RANs having the same respective spatial patterns, whether one beam is an uplink beam and the other is a downlink beam, or vice-versa) due to the positions of one RAN with respect to the other being fixed.

A CLI measurement report may comprise information elements, or parameters, that relate to, or indicate: a measurement resource set or index measurement resource set index, a beam pair set or a set of grouped beam pairs, or a determined/detected CLI spatial coverage or spatial strength value, which spatial strength value may correspond to CLI spatial coverage of a given beam. Based on received CLI measurement reports, RANs, or cells, are able to determine adjacent cells with the most severe CLI contributions, and thus, facilitate additional resource and scheduling coordination among the aggressor and victim RANs. Thus, dynamic procedures are disclosed that facilitate beam-based CLI measurements to sufficiently determine CLI coverage and/or strength while reducing use of backhaul signaling overhead.

Figure 3:
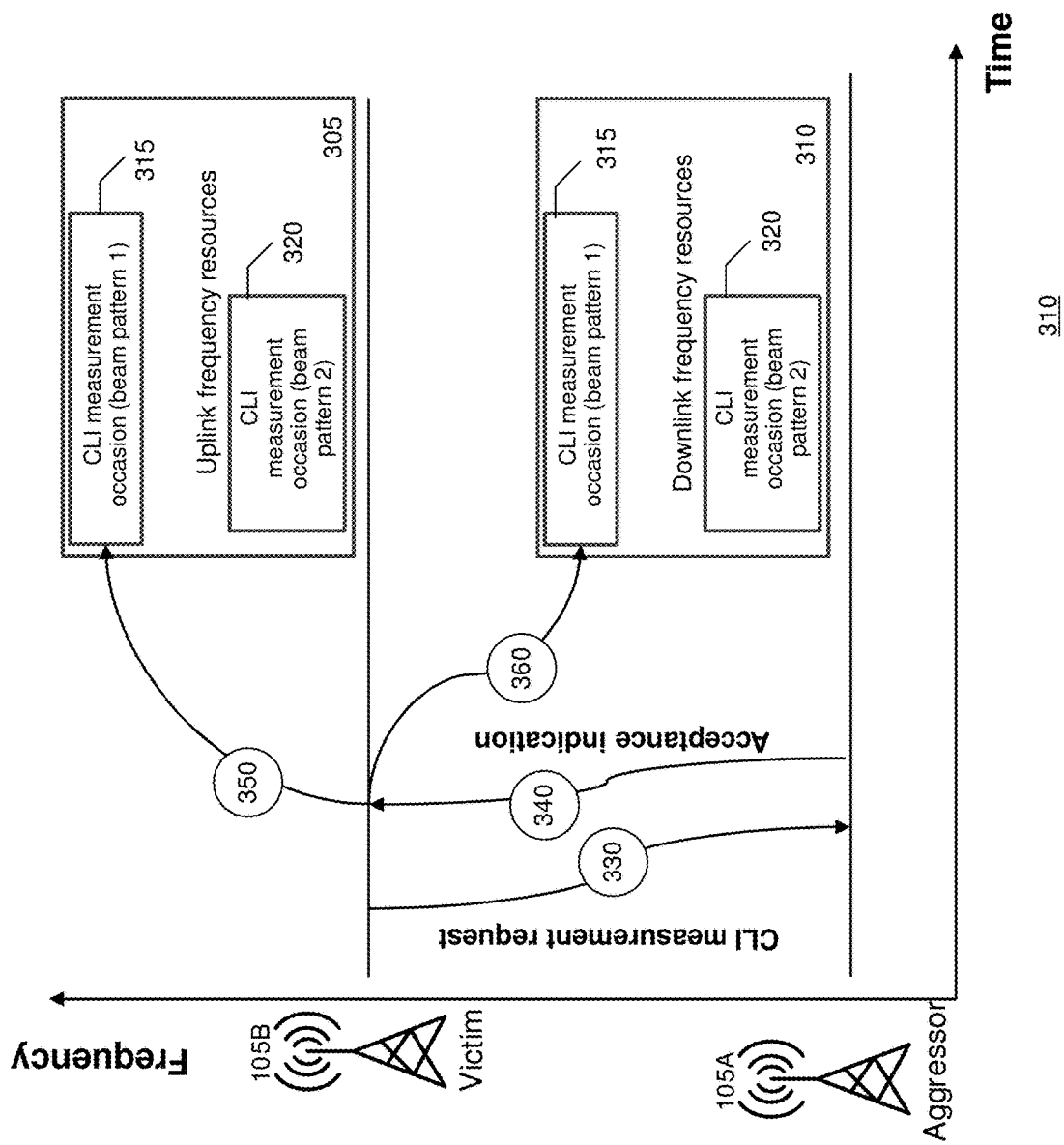
FIG. 3 illustrates an example embodiment of indications of wireless resources to be measured.

Turning now to FIG. 3, the figure illustrates uplink RF resources 305 and downlink RF resources 310 associated with an uplink victim RAN 105B and a downlink aggressor RAN, respectively, with full duplex sub-band 315 and full duplex sub-band 320 being time unit and spectrum frequency resources associated with respective beam patterns that the victim cell RAN has identified as being impacted by severe BS-BS CLI. At act 330 Victim RAN 105B transmits a CLI measurement request towards adjacent aggressor RAN/cell 105A. The CLI measurement request may indicate a coordinated beam pattern pair of uplink-downlink beam patterns for which CLI measurement is desired by, or determined by, victim RAN 105B. In response to having received the CLI measurement request, aggressor cell 105B either accepts, rejects, or counteroffers, in an acknowledgement, CLI configuration parameters that were part of the CLI measurement request. In the example shown in FIG. 3, aggressor RAN 105A accepts parameters of the request transmitted at act 330. Upon acceptance, the RAN pair 105A-105B coordinate at act 340 regarding CLI measurement resources, transmit and receive beam pairs to be tested, and a type of CLI measurement reference signal transmission to be used for performing CLI measurement. Aggressor RAN 105A transmits at act 350 the coordinated reference signal at the frequency and time, and via the beam pattern pairs coordinated at act 340. Victim RAN determines or estimates inter-cell CLI channel measurement parameter information corresponding to each of one or more trained, or coordinated, full duplex sub-bands and for the coordinated beam pattern pairs. The victim cell compiles a CLI measurement report and transmits it towards aggressor RAN 105A via a backhaul interface over which RAN 105A and RAN 105B may communicate. Providing the CLI measurement report from victim RAN 105B to aggressor RAN 105A may facilitate RAN 105A using the measured information contained in the CLI measurement report if the roles of RAN 105A and RAN 105B are reversed and RAN 105A is a victim RAN with respect to RAN 105B being an aggressor RAN because the CLI channel is semi-static between each cell-beam-pattern-pair due to the fixed relative positions of the RANs, thus a single CLI measurement cycle for each cell beam pattern pair may be used by either RAN for tailoring downlink transmission during a time when the other RAN may have a scheduled uplink receiving opportunity, or occasion, during the same period.

For beam-based systems, (e.g., mmWave and higher frequencies), a downlink transmit beam adopted by a RAN and an uplink receive beam adopted by another RAN can significantly impact inter-cell interference. Therefore, in an embodiment CLI measurement may be geared towards estimating the CLI channel over each of the available beams instead of measuring every beam pair combination between two RANs. In scenarios of high spectrum use with a large number of antennas and a large number of beams, a CLI measurement cycle may consume a not insignificant amount of time and resources and may delay delivery of actual traffic payload packets (e.g., packets not associated with measurement/testing signals) if CLI measurement is performed for every pair combination of beams from the victim and aggressor RANs. Such measurement of every possible beam pair combination would likely degrade spectral efficiency in delivering the actual payload packets. Therefore, in an example embodiment, victim and aggressor RANS may coordinate with each other certain selected beam pairs, from all beams available for use by the respective RANs, to use to perform CLI measurement. By strategically selecting certain beams from an aggressor RAN and corresponding victim RAN to use for performing measurements instead of performing CLI measurement for every possible beam pair combination, resource consumption and corresponding potential delay of actual traffic delivery that may be occurring during a CLI measurement procedure may be reduced without significantly impacting the quality of the information contained in a CLI measurement report. The beam pair combinations used for measuring/testing may be selected based on past CLI interference measurement. The beam pair combinations may be selected based on grouping spatially adjacent uplink beams together and pairing the group with a given downlink beam corresponding to an aggressor RAN, which given downlink beam may be selected according to a configured plan, such as every other downlink beam instead of every downlink beam, or every third downlink beam, and so on.

As shown by FIG. 4, coordinating RANs/cells 105B and 105A agree, based on the CLI measurement request (victim RAN sends a request and aggressor RAN acknowledges agreement, rejection, or proposes different CLI measurement parameters in an acknowledgement response to the request), on the beam-subset over which the CLI measurement is performed, by defining and coordinating a beam shift pattern, or simply a beam pattern combination or beam pattern grouping, per each resource set, such that a transmit beam can be associated with one or more of the receive beams. In coordinated beam combination/group pattern 415 (beam patterns 405 and 410 that are not shaded) a reference signal is transmitted via downlink beam 405A from RAN 105A and RAN 105B sequentially performs a CLI measurement of the reference signal for each uplink beam 410D, 410C, and 410B. In other words, RAN 105A may emit a reference signal in downlink beam 405A for a configured measurement period during which RAN 105B performs signal measurements of the reference signal received via beams 410D, 410C, and 410B. It will be appreciated that the 'Time' indication in FIG. 4 shows a sequence of measurement of the reference signal in uplink beam 410D before the measurement of the reference signal in uplink beam 410C which is shown being performed before measurement of the reference signal in uplink beam 410B. This may be an arbitrary sequence, or the sequence may be configured as determined by an engineer, or other personnel, or as determined automatically by a processor of a computing system, based on network conditions, electrical phenomenon such as hysteresis, or other conditions or factors that may make one sequence preferable over another. It will be appreciated that measuring CLI for the sequence of beams 410D, 410C, and 410B for a reference signal emitted in beam 405B from RAN 105a would take about 12% as long as if measurements were made for each of the five beams 410A-E (reference letters for beams 410A and 410E are not shown for beam pattern 415 since in the example described the downlink reference signal was measured for uplink beams 410A and 410E) for each of downlink beams 405A-E (reference letters B-E are not shown since measurements for downlink beams 405B-E are not performed in the described example). (Measuring a reference signal in three uplink beams 410 for one downlink beam 405 instead of measuring the reference signal in five uplink beams 410 for each of the five downlink beams 405 results in three measurements instead of twenty-five measurements: 3/25×100=12%.) In an embodiment, performing measurements according to configured beam pattern 415 may provide an acceptable approximation of CLI at RAN 105A during an uplink sub-band that results from a downlink transmission during the same time at the same frequency from RAN 105B. In an embodiment, performing measurements according to configured beam pattern 415 may provide a basis for extrapolating an estimated CLI in uplink beams 410A and 410 E. Furthermore, since downlink beam 405A is likely to produce the highest CLI at RAN 105B of all beams 405A-E due to being spatially aimed most directly at RAN 105B, performing CLI measurement with a reference signal emitting only from downlink beam 405A and only for uplink beams 410B-D may provide an acceptable estimate of a worst case CLI at RAN 105B from a downlink transmission from RAN 105A while only consuming 12% of resources that might otherwise be used to perform measurement of CLI for each combination of uplink beams 410 and downlink beans 405.

CLI measurement according to beam pattern 420 may be performed for a reference signal being emitted from RAN 105A via beam 405B only for uplink beams 410C and 410D. Since downlink beam 405B is less spatially aimed at RAN 105B than downlink beam 405A, only performing a measurement for two uplink beams instead of three may be deemed as providing a basis for an acceptable estimate of CLI from RAN 105A in downlink 405B. It will be appreciated that, as described above, report information generated based on CLI measurements, or estimates, made at RAN 105B may be shared with RAN 105A and may be used thereby when RAN 105A is a victim with respect to RAN 105B being an aggressor. For example, a CLI measurement made at RAN 105B for uplink beam 410B for a reference signal emitted from RAN 105A via downlink beam 405A during a measurement procedure according to beam pattern 415 would likely be indicative of a CLI at RAN 105A if beam 405A were an uplink beam pattern and a reference signal were being emitted from RAN 105B via beam 410B if beam 410B were functioning as a downlink beam.

FIG. 13 illustrates in chart 1305 example content of the CLI measurement request is presented. The CLI measurement request may include the following information elements.

Cell specific CLI measure priority index and/or value: an aggressor RAN/cell may determine priority levels for one or more victim RANs/cells for a CLI measurement cycle/procedure. Prioritization may be useful if various adjacent cells have conflicting CLI measurements resources and/or beam adoption. Therefore, prioritization may facilitate the aggressor node determining whether to accept, and acknowledge in an acknowledgement, some, or all, proposed CLI measurement parameters of a CLI measurement request requesting CLI measurement parameter information. A victim cell may determine a corresponding cell-specific CLI measurement priority based on core network reconfigurations that may comprise a mapping list of a full duplex sub-band to be used for measurement.

CLI measurement resource sets: multiple resource sets for performing the CLI measurement among each cell pair including the frequency and timing resources and/or resource pattern indications.

CLI measurement beam switching pattern: multiple sets, or groupings, of transmit and receive beam patterns or indications, associated with each resource set and a type of a transmitted CLI reference signal. The latter indication may facilitate an aggressor cell in reusing an already-active reference signals on certain beams for CLI measurements towards victim cells, removing the resource waste of transmitting a different CLI measurement reference signal.

A coordinating cell pair may proceed with the CLI measurement, according to the beam and resource configurations. Thus, an victim uplink cell may determine and estimate a cross-CLI channel and corresponding CLI coverage and/or strength. The CLI victim cells may compile a CLI measurement report and transmit it towards aggressor cells. The report may includes a determined CLI coverage or other information as shown Chart 1310 in FIG. 13.

Figure 5:
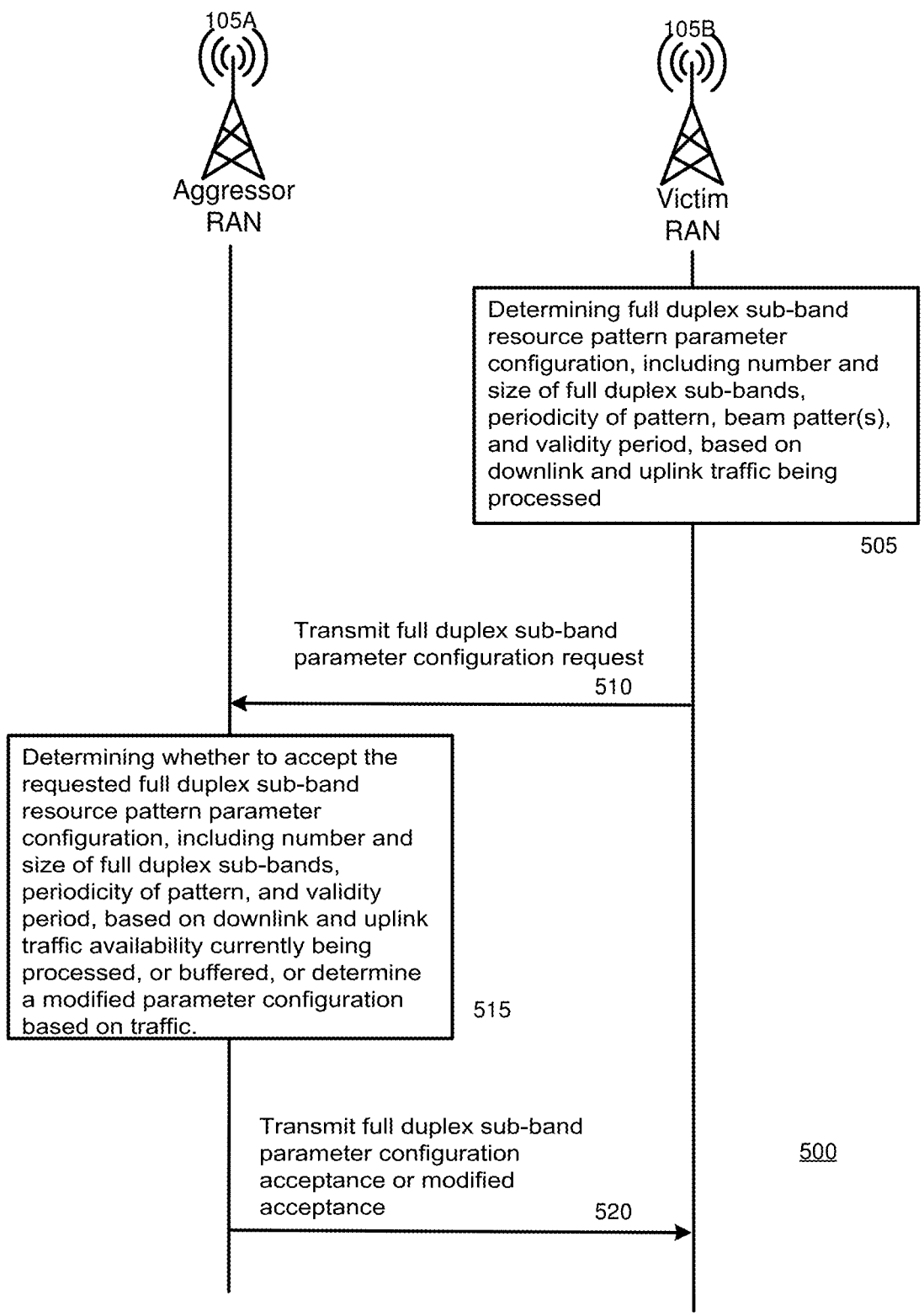
FIG. 5 illustrates a timing diagram of an example negotiation embodiment between a victim RAN node and an aggressor RAN node.

Turning now to FIG. 5, the figure illustrates a timing diagram of an example negotiation embodiment 500 showing an aggressor RAN node 105A negotiating and agreeing with a victim RAN node 105B regarding a configuration of parameters to use for measuring CLI between the RAN nodes. Victim RAN node 105B determines at act 605 parameters to use during a CLI measurement/testing procedure, or process, and transmits those parameters to aggressor RAN 105A at act 610. Aggressor RAN node 105A determines at act 615 whether the parameters transmitted by RAN 105B at act 610 can be supported by the aggressor RAN and act 620 transmits back to the victim RAN either an acknowledgement of acceptance of the CLI measurement parameter information transmitted by the victim RAN or an acknowledgement with a proposed modified parameter configuration to use during CLI measurement/testing and transmits those parameters to aggressor RAN 105A at act 610. The determination by victim RAN 105B at act 605 of a parameter configuration to be used for CLI measurement may be made based on past performance of receiving and decoding uplink traffic at a given frequency, or frequencies, and via a given uplink beam. Or beams. The determination by victim RAN 105B at act 605 of a parameter configuration to be used for CLI measurement may be made based on current traffic that the victim RAN 105B is receiving and decoding at given uplink timing units (e.g., time slots), frequencies, and uplink beams. For example, in reference to FIG. 3, if victim RAN 105B is receiving and decoding uplink traffic according to time slots, frequencies, and beam pattern parameters 315, then the victim RAN would not request of aggressor RAN 105A at act 330 CLI measurement according to parameters 315. Similarly, continuing with reference to FIG. 6, the determination by aggressor RAN 105A at act 615 of whether to accept the parameter configuration to be used for CLI measurement transmitted by victim RAN 105B may be made based on current traffic that the aggressor victim RAN is transmitting, or scheduled to transmit, during the uplink timing units, and the frequencies, and via downlink beams specified in the request that the victim RAN transmitted at act 610. For example, in reference again to FIG. 3, if aggressor RAN 105A is transmitting traffic according to time slots, frequencies, and beam pattern parameters 315, then the aggressor RAN would not accept the request transmitted by victim RAN 105B at act 330 to participate in CLI measurement according to parameters 315. Nevertheless, in such a scenario aggressor RAN 105A may respond at act 340 with an acknowledgement that comprises an acceptance, or counteroffer, to participate in CLI measurement according only to parameters 320. If, on the other hand, aggressor RAN 105A can accommodate CLI measurement according to parameters 315 and 320 as proposed in the request transmitted by victim RAN 105B at act 330 then aggressor RAN 105a may accept in an acknowledgement at act 340 measurement according to the parameters as requested in the request transmitted at act 330, as previously described in reference to FIG. 3.

Figure 6:
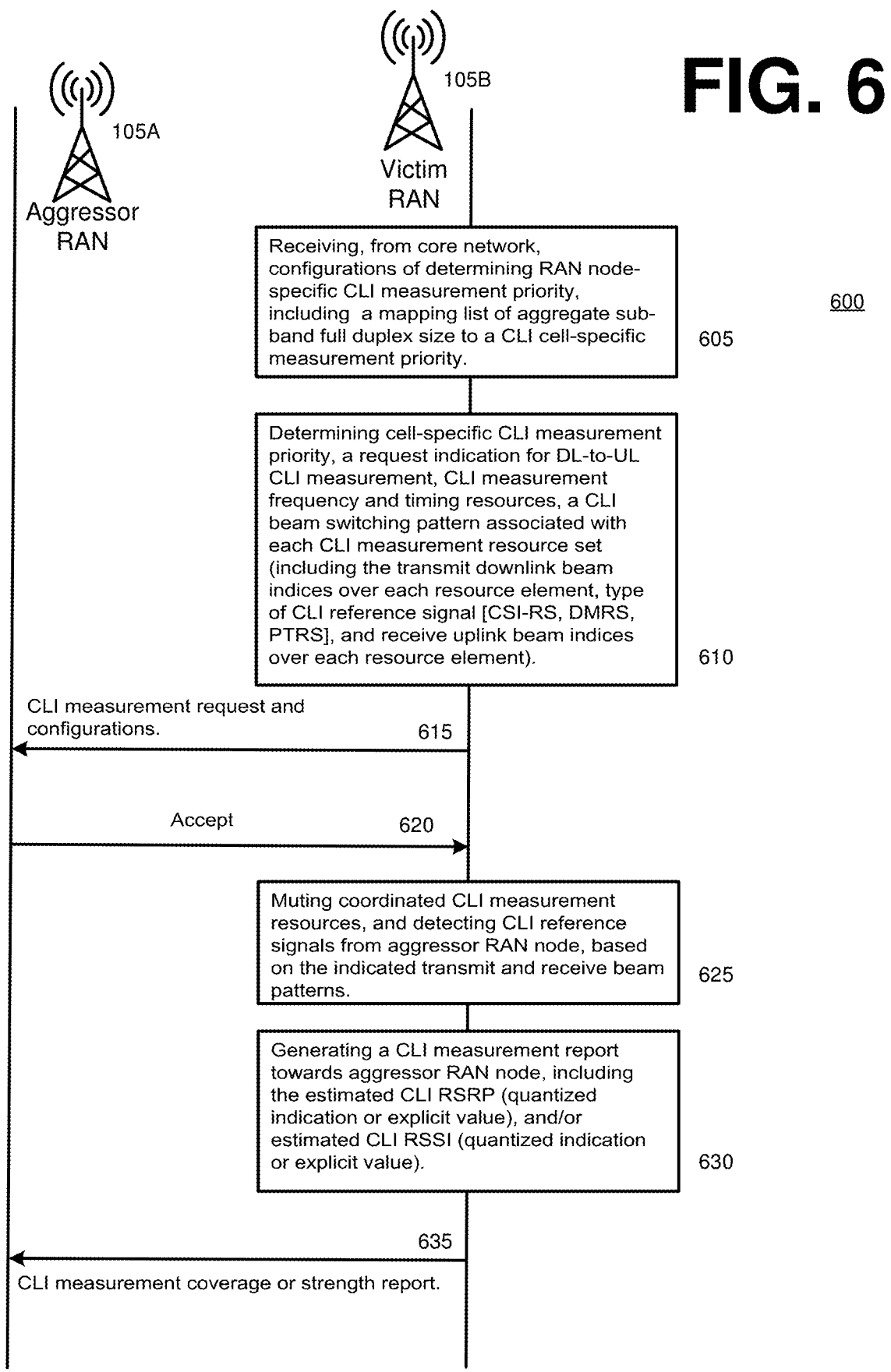
FIG. 6 illustrates a timing diagram of a cross link interference measurement embodiment.

Turning now to FIG. 6, the figure illustrates a timing diagram of an example method 600. At act 605 a victim RAN 105B may receive, from a core network, such as core network 130 shown in FIG. 1, configurations of determining RAN node-specific CLI measurement priority, including a mapping of an aggregate sub-band full duplex size to a CLI cell-specific measurement priority. At act 610 victim RAN 105B may determine proposed CLI measurement parameters, such as a determined cell-specific CLI measurement priority, a request indication for coordinating with the victim RAN in performing Downlink-to-Uplink CLI measurement, CLI measurement frequency and timing resources, a CLI beam switching pattern, or a CLI measurement grouping pattern associated with each CLI measurement resource set (including the transmit downlink beam indices over each resource element, a type of CLI reference signal [e.g., CSI-RS, DMRS, PTRS], and one or more receive-uplink-beam indices over each resource element). At act 615 victim RAN node 105B may transmit toward neighboring nodes, over backhaul interfaces (e.g., Xn/F1 interfaces), the proposed CLI measurement parameters determined at act 610. At act 620 victim RAN 105B may receive an acceptance from downlink aggressor RAN 105A node of the proposed CLI measurements parameters. At act 625 victim RAN 105B may mute coordinated CLI measurement resources such that the muted resources are not used except for performing CLI measurement during a period of the measuring. At act 630 victim RAN 105B may detect CLI reference signals from aggressor RAN 105A vi one or more transmit and receive beam patterns indicated in the proposed and accepted CLI measurement parameters. Victim RAN 105B compiles a CLI measurement report based on the CLI measuring that was performed according to the proposed and accepted CLI measurement parameters, and at act 635 transmits the CLI measurement report towards aggressor RAN 105A, which CLI measurement report may comprise an estimated CLI RSRP (quantized indication or explicit value), and/or an estimated CLI RSSI (quantized indication or explicit value).

CLI Measurement Pre-Training.

Due to the different relative positions and distances among the coordinating cells for CLI measurements, the radio transmissions of the CLI measurement reference signals of some cells may arrive much earlier or later than others at the victim cells. This accordingly leads to the CLI measurement reference signals interfering with either traffic or reference signal transmissions from adjacent cells, and hence, degrading the CLI measurement performance. Thus, setting a proper transmission timing advance/forward offset is desirable corresponding to aggressor cells that are far away from victim cells such that their reference signal transmissions do not arrive later than scheduled, and hence, interfere with scheduled transmissions of actual payload.

a CLI measurement pre-training phase, where a cell-specific preamble, associated and configured to each RAN from core network, may be transmitted before a CLI measurement cycle. During the CLI measurement pre-training, an aggressor RAN transmits its own preamble towards a victim RAN, on a preconfigured set of beams, and accordingly, the victim RAN estimates a timing advance/offset for the aggressor RAN. The victim RAN signals the aggressor RAN, over the backhaul interface, with the determined CLI measurement timing advance. The aggressor RAN adopts the configured timing advance before each CLI measurement reference signal transmission and may trigger their respective CLI reference signal transmissions to the victim RAN earlier according to the configured timing advance.

As discussed, coordinating RANs/cells for CLI measurements may be of differing distances to each other as other coordinating cells. Furthermore, CLI may be viewed as, or indicative of, remote interference due to various spatial clusters, leading to CLI potentially travelling long distances due to relative distance sparsity of CLI coordinating cells (e.g., RAN nodes are far apart, for example in rural areas). In an arrangement of RAN nodes where some aggressor RAN nodes that may cause CLI with a victim RAN are closer to the victim RAN than other aggressor RAN nodes, some CLI measurement reference signals may arrive later from some aggressor RANs than from others.

To correct for this disparity in arrival times of reference signals from different aggressor RANS that are different distances from a victim RAN, a timing advance may be determined such that an advance transmission offset is adopted for aggressor RANs that are located farther away from the victim RAN than other aggressor RANs (e.g., the RANs farther away transmit a bit earlier so that their respective reference signal transmission arrives timely at the victim RAN). To facilitate differing times for transmitting a CLI reference signal from RANS of differing distances from a victim RAN, a cell-specific preamble may be defined and assigned to each of the coordinating aggressor RANs.

A CLI measurement pre-training phase may be performed before performing a CLI measurement procedure, such as the procedure described in reference to FIG. 6. An aggressor RAN, responding to a CLI measurement request, may transmit a preamble, code, identifier, or other value, that corresponds to the aggressor RAN responding to a CLI measurement request, over a configured training resource. The uplink victim RAN may detect the aggressor RAN-specific preamble and determine RAN-specific timing advance/offset corresponding to the aggressor RAN that transmitted the preamble. The victim RAN may exchange a CLI measurement training report with the aggressor RAN that may comprise the determined timing advance or offset for the aggressor RAN. This pre-training phase may be performed for multiple aggressor RANs coordinating with the victim RAN for CLI measuring. A potential need to perform multiple rounds of CLI measurement pre-training for the same victim and aggressor cell pair may be reduced, if not eliminated, due to the static relative locations and channels. Thereafter, aggressor RANs may adopt the determined corresponding timing advance/offsets when transmitting CLI measurement reference signals in cooperation with the victim RAN.

Figure 7:
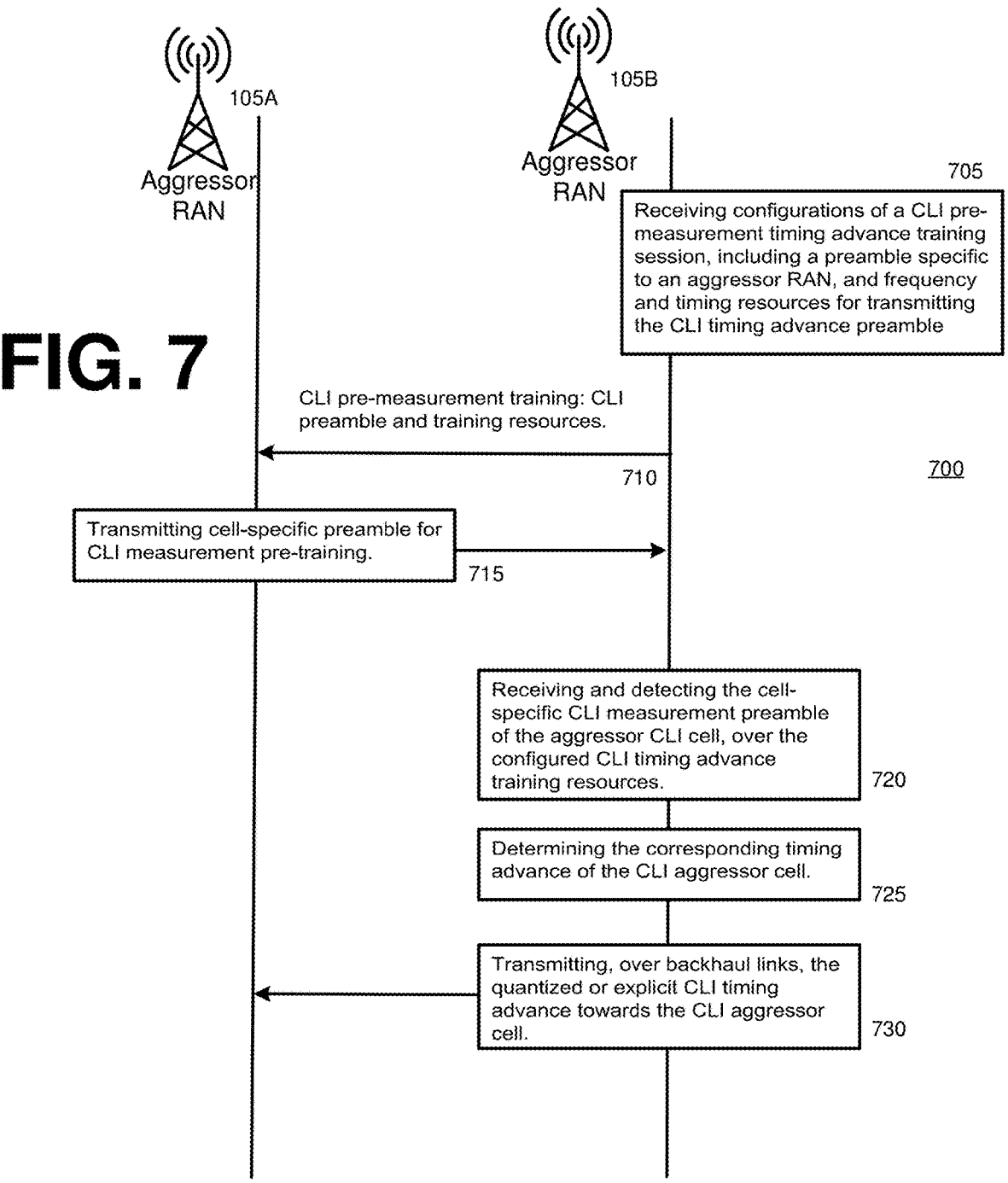
FIG. 7 illustrates a timing diagram of a cross link interference measurement pre-training embodiment.

Turning now to FIG. 7, the figure illustrates a timing diagram of an example pre-training method 700. At act 705 victim RAN 105B receives from an adjacent RAN node, or from a core network, configurations of a CLI pre-measurement timing advance training session, including a cell-specific preamble, and frequency and timing resources for transmitting the CLI timing advance preamble. RAN 105B transmits the pre-training configuration to aggressor RAN 105A at act 710. At act 720 RAN 105B receives and detects the cell-specific CLI measurement preamble of CLI aggressor RAN 105A, over the configured CLI timing advance training resources. At act 725 RAN 105B determines a corresponding timing advance of CLI aggressor cell 105A, (in an example embodiment based on a time of arrival and timing information transmitted in preamble message at act 715). At act 730 victim RAN 105B transmits, over backhaul interfaces, or links, a quantized or explicit CLI timing advance towards CLI aggressor RAN 105A.

Figure 8:
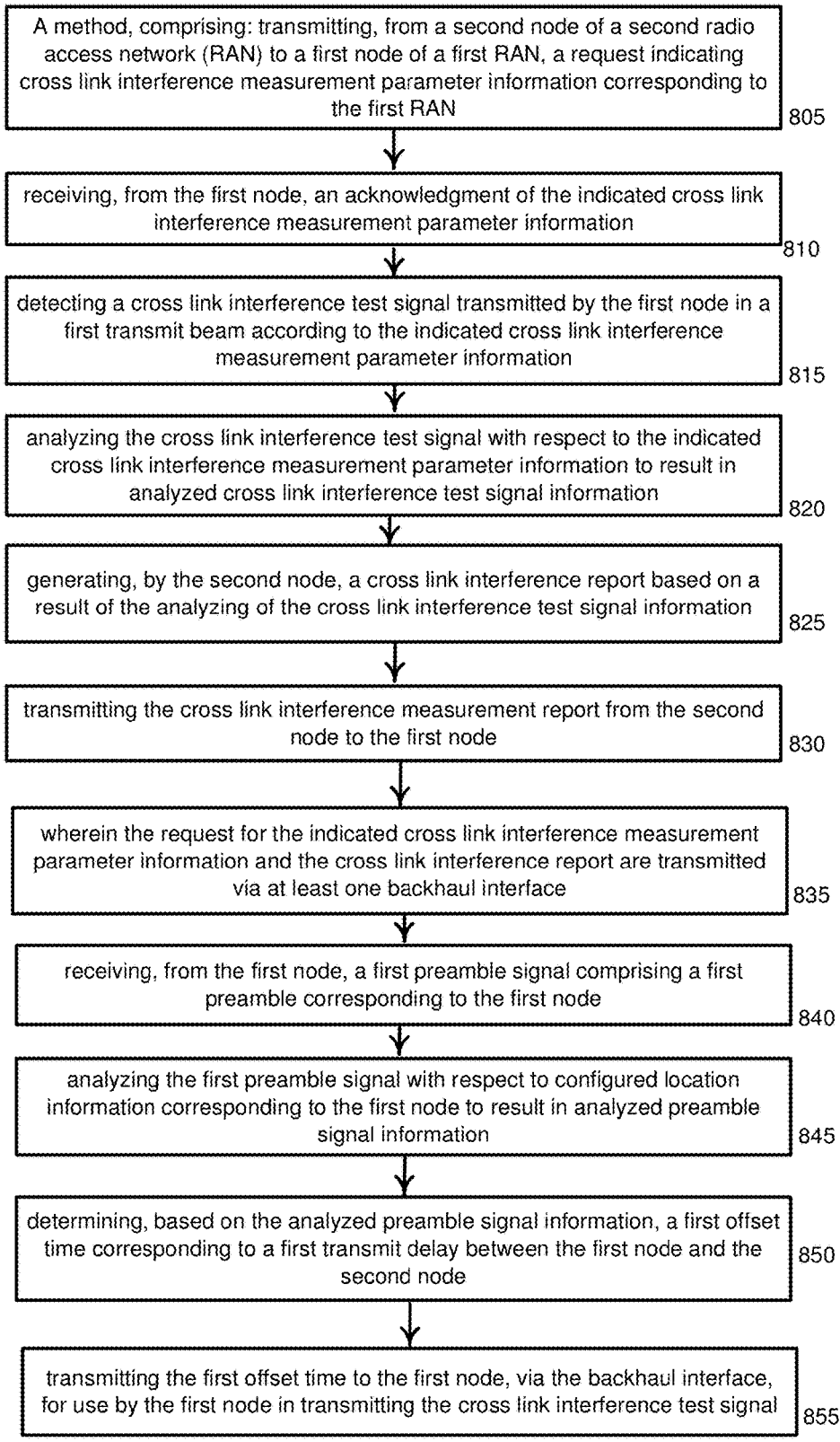
FIG. 8 illustrates a block diagram of an example method.

Turning now to FIG. 8, the figure illustrates an example embodiment method 800 comprising at block 805 transmitting, from a second node of a second radio access network (RAN) to a first node of a first RAN, a request indicating cross link interference measurement parameter information corresponding to the first RAN; at block 810 receiving, from the first node, an acknowledgment of the indicated cross link interference measurement parameter information; at block 815 detecting a cross link interference test signal transmitted by the first node in a first transmit beam according to the indicated cross link interference measurement parameter information; at block 820 analyzing the cross link interference test signal with respect to the indicated cross link interference measurement parameter information to result in analyzed cross link interference test signal information; at block 825 generating, by the second node, a cross link interference report based on a result of the analyzing of the cross link interference test signal information; at block 830 transmitting the cross link interference measurement report from the second node to the first node; at block 835 wherein the request for the indicated cross link interference measurement parameter information and the cross link interference report are transmitted via at least one backhaul interface; at block 840 receiving, from the first node, a first preamble signal comprising a first preamble corresponding to the first node; at block 845 analyzing the first preamble signal with respect to configured location information corresponding to the first node to result in analyzed preamble signal information; at block 850 determining, based on the analyzed preamble signal information, a first offset time corresponding to a first transmit delay between the first node and the second node; and at block 855 transmitting the first offset time to the first node, via the backhaul interface, for use by the first node in transmitting the cross link interference test signal.

Figure 9:
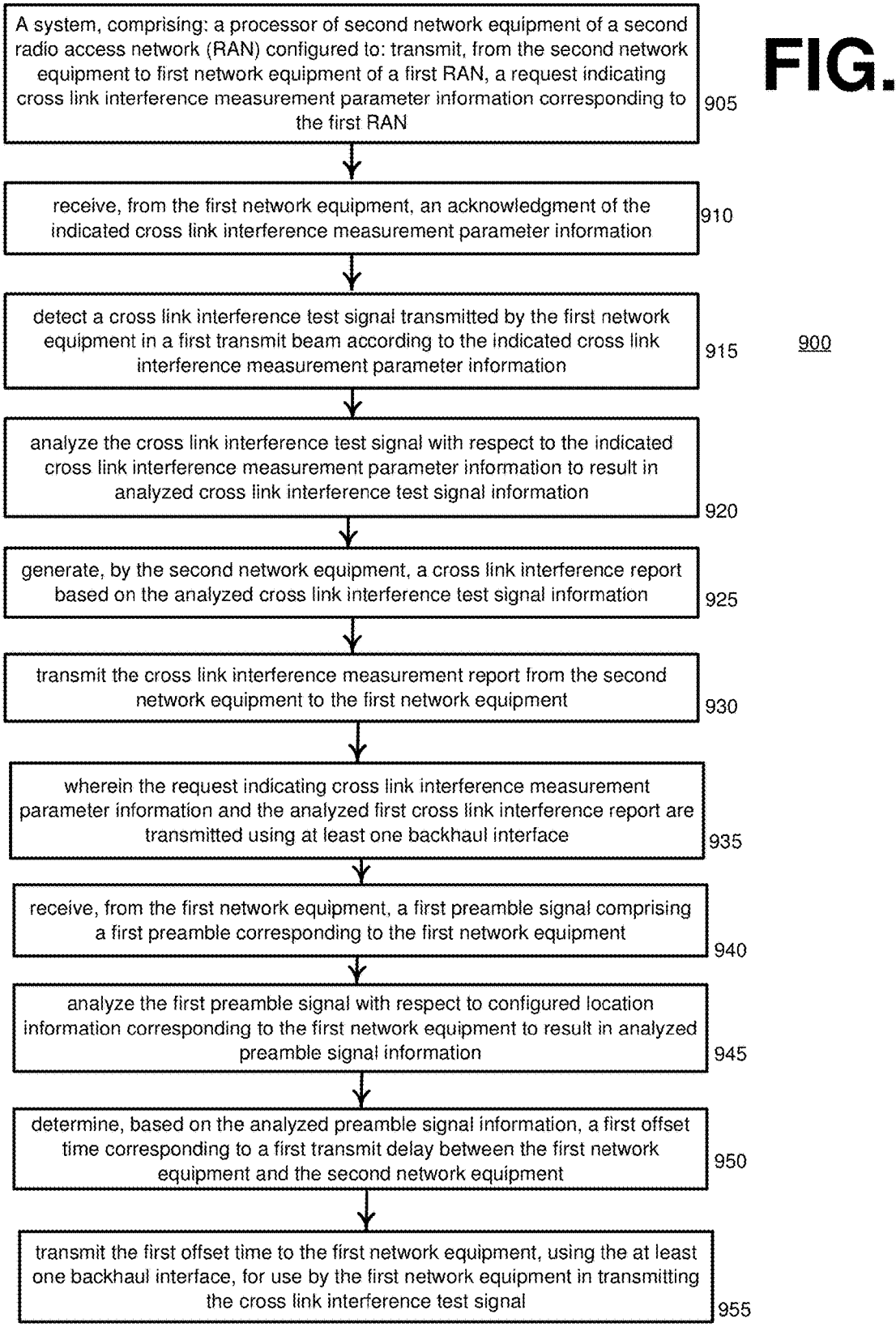
FIG. 9 illustrates a block diagram of an example system.

Turning now to FIG. 9, the figure illustrates an example system embodiment 900 comprising at step 905 a processor of second network equipment of a second radio access network (RAN) configured to: transmit, from the second network equipment to first network equipment of a first RAN, a request indicating cross link interference measurement parameter information corresponding to the first RAN; at block 910 receive, from the first network equipment, an acknowledgment of the indicated cross link interference measurement parameter information; at block 915 detect a cross link interference test signal transmitted by the first network equipment in a first transmit beam according to the indicated cross link interference measurement parameter information; at block 920 analyze the cross link interference test signal with respect to the indicated cross link interference measurement parameter information to result in analyzed cross link interference test signal information; at block 925 generate, by the second network equipment, a cross link interference report based on the analyzed cross link interference test signal information; at block 930 transmit the cross link interference measurement report from the second network equipment to the first network equipment; at block 935 wherein the request indicating cross link interference measurement parameter information and the analyzed first cross link interference report are transmitted using at least one backhaul interface; at block 940 receive, from the first network equipment, a first preamble signal comprising a first preamble corresponding to the first network equipment; at block 945 analyze the first preamble signal with respect to configured location information corresponding to the first network equipment to result in analyzed preamble signal information; at block 950 determine, based on the analyzed preamble signal information, a first offset time corresponding to a first transmit delay between the first network equipment and the second network equipment; and at block 955 transmit the first offset time to the first network equipment, using the at least one backhaul interface, for use by the first network equipment in transmitting the cross link interference test signal.

Figure 10:
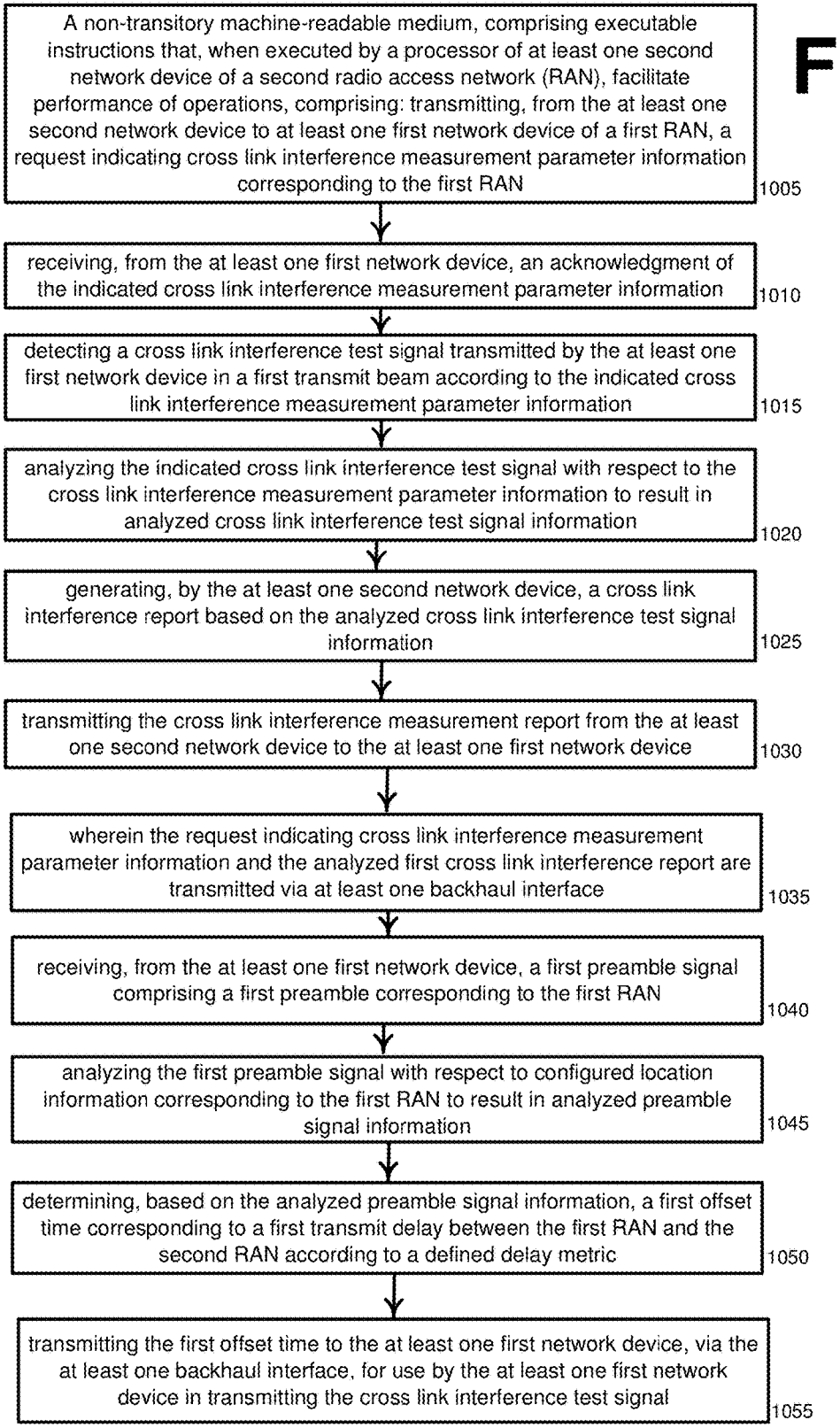
FIG. 10 illustrates a block diagram of an example non-transitory machine-readable medium embodiment.

Turning now to FIG. 10, the figure illustrates a non-transitory machine-readable medium 1000 comprising at block 1005 executable instructions that, when executed by a processor of at least one second network device of a second radio access network (RAN), facilitate performance of operations, comprising: transmitting, from the at least one second network device to at least one first network device of a first RAN, a request indicating cross link interference measurement parameter information corresponding to the first RAN; at block 1010 receiving, from the at least one first network device, an acknowledgment of indicated cross link interference measurement parameter information; at block 1015 detecting a cross link interference test signal transmitted by the at least one first network device in a first transmit beam according to the indicated cross link interference measurement parameter information; at block 1020 analyzing the cross link interference test signal with respect to the indicated cross link interference measurement parameter information to result in analyzed cross link interference test signal information; at block 1025 generating, by the at least one second network device, a cross link interference report based on the analyzed cross link interference test signal information; at block 1030 transmitting the cross link interference measurement report from the at least one second network device to the at least one first network device; at block 1035 wherein the request indicating cross link interference measurement parameter information and the analyzed first cross link interference report are transmitted via at least one backhaul interface; at block 1040 receiving, from the at least one first network device, a first preamble signal comprising a first preamble corresponding to the first RAN; at block 1045 analyzing the first preamble signal with respect to configured location information corresponding to the first RAN to result in analyzed preamble signal information; at block 1050 determining, based on the analyzed preamble signal information, a first offset time corresponding to a first transmit delay between the first RAN and the second RAN according to a defined delay metric; and at block 1055 transmitting the first offset time to the at least one first network device, via the at least one backhaul interface, for use by the at least one first network device in transmitting the cross link interference test signal.

Figure 11:
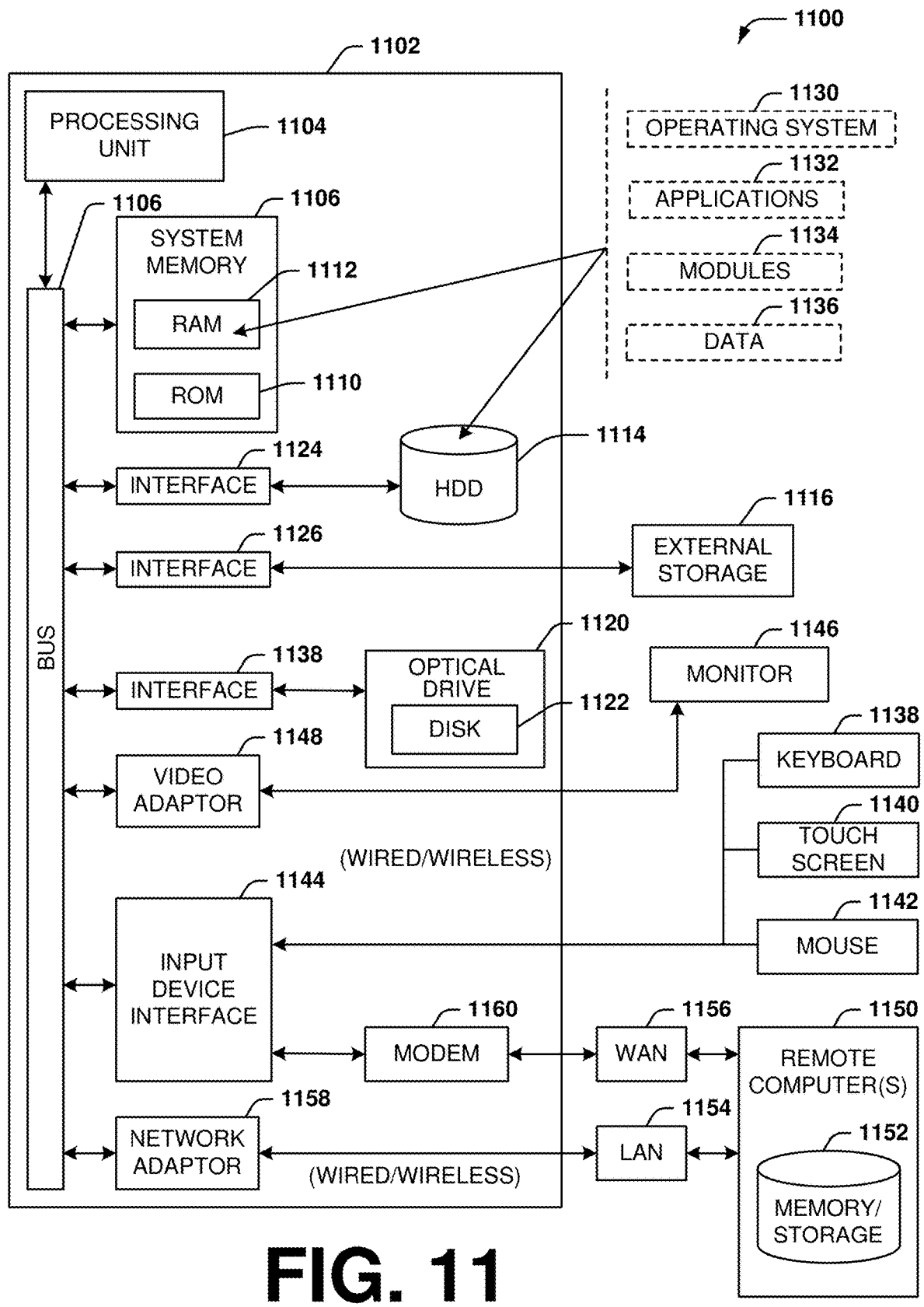
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
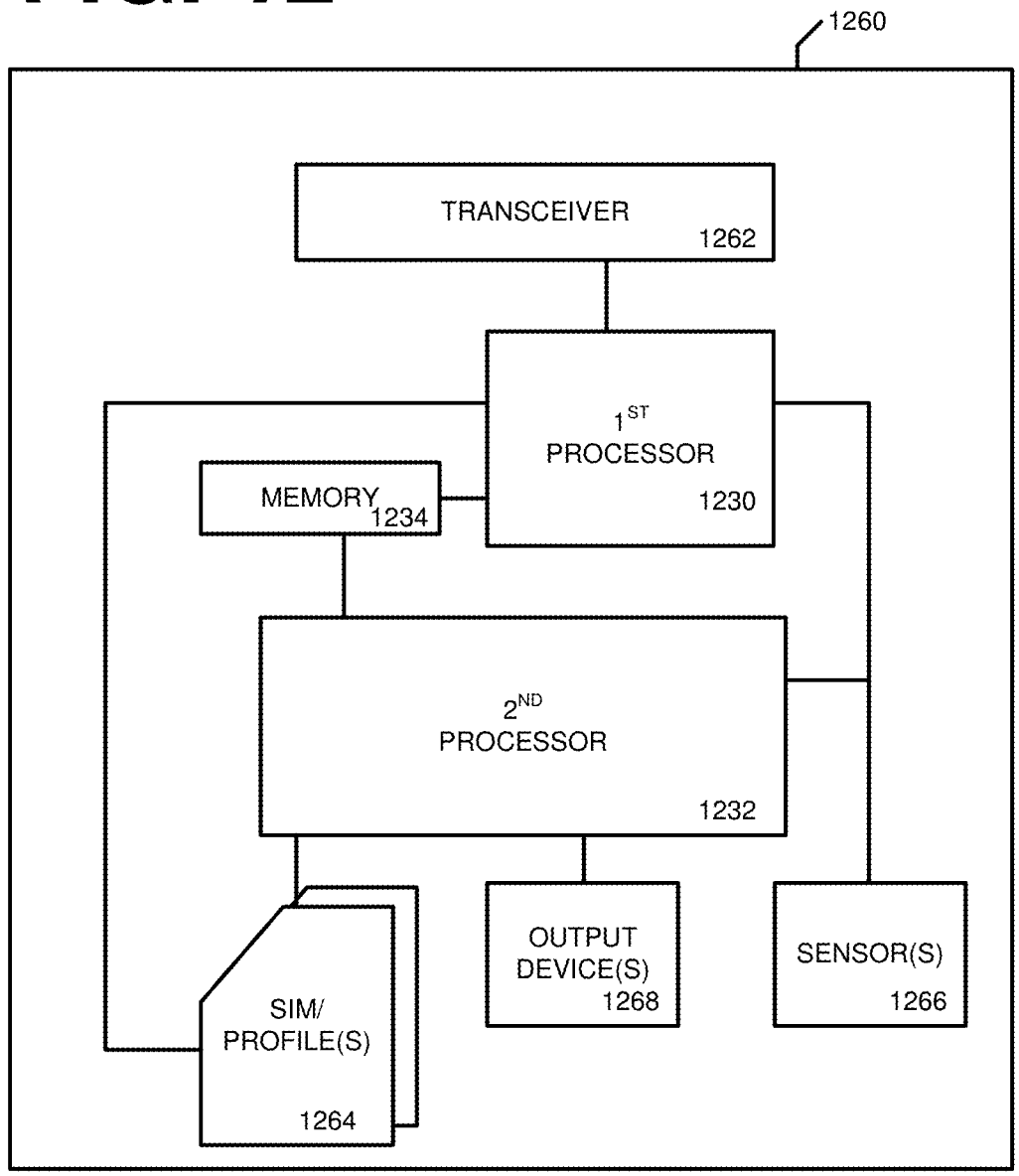
FIG. 12 illustrates a block diagram of an example wireless UE.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 34 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 30 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |

TABLE 1-continued

| Term | Definition |
|---|---|
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| URLLC | Ultra reliable and low latency communication |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   transmitting, from a second node of a second radio access network (RAN) to a first node of a first RAN, a request indicating cross link interference measurement parameter information corresponding to the first RAN;
   receiving, from the first node, an acknowledgment of the indicated cross link interference measurement parameter information;
   detecting a cross link interference test signal transmitted by the first node in a first transmit beam according to the indicated cross link interference measurement parameter information;
   analyzing the cross link interference test signal with respect to the indicated cross link interference measurement parameter information to result in analyzed cross link interference test signal information;
   generating, by the second node, a cross link interference report based on a result of the analyzing of the cross link interference test signal information; and
   transmitting the cross link interference measurement report from the second node to the first node,
   wherein the request for the indicated cross link interference measurement parameter information and the cross link interference report are transmitted via at least one backhaul interface.

2. The method of claim 1, wherein the indicated cross link interference measurement parameter information comprises at least one of: at least one measurement time resource, at least one measurement frequency resource, at least one priority level, at least one transmit and receive beam grouping indication, or at least one cross link interference test signal type.

3. The method of claim 1, further comprising muting, by the second node, a resource corresponding to the indicated cross link interference measurement parameter information during a test period for which the first node is configured to transmit the cross link interference test signal according to the indicated cross link interference measurement parameter information.

4. The method of claim 1, further comprising:
receiving, from the first node, a first preamble signal comprising a first preamble corresponding to the first node;
analyzing the first preamble signal with respect to configured location information corresponding to the first node to result in analyzed preamble signal information;
determining, based on the analyzed preamble signal information, a first offset time corresponding to a first transmit delay between the first node and the second node; and
transmitting the first offset time to the first node, via the backhaul interface, for use by the first node in transmitting the cross link interference test signal.

5. The method of claim 4, wherein the detecting, by the second node, of the cross link interference test signal transmitted by the first node in the first transmit beam comprises detecting the cross link interference test signal in a first uplink beam and in a second uplink beam, wherein the cross link interference test signal is analyzed for the first uplink beam and for the second uplink beam, wherein the analyzed cross link interference test signal information comprises first analyzed cross link interference test signal information corresponding to analyzing the cross link interference test signal detected in the first uplink beam, and wherein the analyzed cross link interference test signal information comprises second analyzed cross link interference test signal information corresponding to analyzing the cross link interference test signal detected in the second uplink beam.

6. The method of claim 5, further comprising:
detecting the cross link interference test signal transmitted by the first node in a second transmit beam according to the indicated cross link interference measurement parameter information,
wherein the detecting, by the second node, of the cross link interference test signal transmitted by the first node in the second transmit beam comprises detecting the cross link interference test signal in at least a third uplink beam, wherein the cross link interference test signal is analyzed for at least the third uplink beam, and wherein the analyzed cross link interference test signal information further comprises third analyzed cross link interference test signal information corresponding to analyzing the cross link interference test signal detected in at least the third uplink beam.

7. The method of claim 1, wherein the detecting of the cross link interference test signal transmitted by the first node in the first transmit beam and the analyzing the cross link interference test signal to result in the analyzed cross link interference test signal information are performed for at least one of: at least one measurement time resource, at least one measurement frequency resource, at least one priority level, at least one transmit and receive beam grouping indication, or at least one cross link interference test signal type.

8. The method of claim 1, further comprising determining, by the second node, a priority level based on a mapping of a full duplex sub-band pattern corresponding to the second node.

9. A system, comprising:
a processor of second network equipment of a second radio access network (RAN) configured to:
transmit, from the second network equipment to first network equipment of a first RAN, a request indicating cross link interference measurement parameter information corresponding to the first RAN;
receive, from the first network equipment, an acknowledgment of the indicated cross link interference measurement parameter information;
detect a cross link interference test signal transmitted by the first network equipment in a first transmit beam according to the indicated cross link interference measurement parameter information;
analyze the cross link interference test signal with respect to the indicated cross link interference measurement parameter information to result in analyzed cross link interference test signal information;
generate, by the second network equipment, a cross link interference report based on the analyzed cross link interference test signal information; and
transmit the cross link interference measurement report from the second network equipment to the first network equipment;
wherein the request indicating cross link interference measurement parameter information and the analyzed first cross link interference report are transmitted using at least one backhaul interface.

10. The system of claim 9, wherein the processor is further configured to mute a resource of the second RAN corresponding to the indicated cross link interference measurement parameter information for a test period during which the first network equipment is configured to transmit the cross link interference test signal according to the indicated cross link interference measurement parameter information.

11. The system of claim 9, wherein the processor is further configured to:
receive, from the first network equipment, a first preamble signal comprising a first preamble corresponding to the first network equipment;
analyze the first preamble signal with respect to configured location information corresponding to the first network equipment to result in analyzed preamble signal information;
determine, based on the analyzed preamble signal information, a first offset time corresponding to a first transmit delay between the first network equipment and the second network equipment; and
transmit the first offset time to the first network equipment, using the at least one backhaul interface, for use by the first network equipment in transmitting the cross link interference test signal.

12. The system of claim 11, wherein detection, by the second network equipment, of the cross link interference test signal transmitted by the first network equipment in the first transmit beam comprises the detection of the cross link interference test signal in a first uplink beam and in a second uplink beam, wherein an analysis of the cross link interference test signal is performed for the first uplink beam and for the second uplink beam, wherein the analyzed cross link interference test signal information comprises first analyzed cross link interference test signal information corresponding to the analysis of the cross link interference test signal detected in the first uplink beam, and wherein the analyzed cross link interference test signal information comprises second analyzed cross link interference test signal information corresponding to the analysis of the cross link interference test signal detected in the second uplink beam.

13. The system of claim 12, wherein the processor is further configured to:
    detect the cross link interference test signal transmitted by the first network equipment in a second transmit beam according to the indicated cross link interference measurement parameter information,
    wherein detection, by the second network equipment, of the cross link interference test signal transmitted by the first network equipment in the second transmit beam comprises detecting the cross link interference test signal in at least a third uplink beam, wherein the analysis of the cross link interference test signal is further performed for at least the third uplink beam, and wherein the analyzed cross link interference test signal information comprises third analyzed cross link interference test signal information corresponding to the analysis of the cross link interference test signal detected in at least the third uplink beam.

14. The system of claim 9, wherein detection of the cross link interference test signal transmitted by the first network equipment in the first transmit beam and analysis of the cross link interference test signal to result in the analyzed cross link interference test signal information are performed for more than one of: at least one measurement time resource, at least one measurement frequency resource, at least one priority level, at least one transmit and receive beam grouping indication, or at least one cross link interference test signal type.

15. A non-transitory machine-readable medium, comprising executable instructions that, when executed by a processor of at least one second network device of a second radio access network (RAN), facilitate performance of operations, comprising:
    transmitting, from the at least one second network device to at least one first network device of a first RAN, a request indicating cross link interference measurement parameter information corresponding to the first RAN;
    receiving, from the at least one first network device, an acknowledgment of the indicated cross link interference measurement parameter information;
    detecting a cross link interference test signal transmitted by the at least one first network device in a first transmit beam according to the indicated cross link interference measurement parameter information;
    analyzing the cross link interference test signal with respect to the indicated cross link interference measurement parameter information to result in analyzed cross link interference test signal information;
    generating, by the at least one second network device, a cross link interference report based on the analyzed cross link interference test signal information; and
    transmitting the cross link interference measurement report from the at least one second network device to the at least one first network device;
    wherein the request indicating cross link interference measurement parameter information and the analyzed first cross link interference report are transmitted via at least one backhaul interface.

16. The non-transitory machine-readable medium of claim 15, wherein the operations further comprise muting a resource of the second RAN corresponding to the indicated cross link interference measurement parameter information for a test period during which the at least one first network device is configured to transmit the cross link interference test signal according to the cross link interference measurement parameter information.

17. The non-transitory machine-readable medium of claim 15, wherein the operations further comprise:
    receiving, from the at least one first network device, a first preamble signal comprising a first preamble corresponding to the first RAN;
    analyzing the first preamble signal with respect to configured location information corresponding to the first RAN to result in analyzed preamble signal information;
    determining, based on the analyzed preamble signal information, a first offset time corresponding to a first transmit delay between the first RAN and the second RAN according to a defined delay metric; and
    transmitting the first offset time to the at least one first network device, via the at least one backhaul interface, for use by the at least one first network device in transmitting the cross link interference test signal.

18. The non-transitory machine-readable medium of claim 17, wherein the detecting, by the at least one second network device, of the cross link interference test signal transmitted by the at least one first network device in the first transmit beam comprises detecting the cross link interference test signal in a first uplink beam and in a second uplink beam, wherein the cross link interference test signal is analyzed for the first uplink beam and for the second uplink beam, wherein the analyzed cross link interference test signal information comprises first analyzed cross link interference test signal information corresponding to analyzing the cross link interference test signal detected in the first uplink beam, and wherein the analyzed cross link interference test signal information comprises second analyzed cross link interference test signal information corresponding to analyzing the cross link interference test signal detected in the second uplink beam.

19. The non-transitory machine-readable medium of claim 18, wherein the operations further comprise:
    detecting the cross link interference test signal transmitted by the at least one first network device in a second transmit beam according to the indicated cross link interference measurement parameter information,
    wherein the detecting, by the at least one second network device, of the cross link interference test signal transmitted by the at least one first network device in the second transmit beam comprises detecting the cross link interference test signal in at least a third uplink beam, wherein the cross link interference test signal is analyzed for at least the third uplink beam, and wherein the analyzed cross link interference test signal information comprises third analyzed cross link interference test signal information corresponding to analyzing the cross link interference test signal detected in at least the third uplink beam.

20. The non-transitory machine-readable medium of claim 15, wherein the detecting of the cross link interference test signal transmitted by the at least one first network device in the first transmit beam and the analyzing the cross link interference test signal to result in the analyzed cross link interference test signal information are performed for more than one of: a measurement time resource, a measurement frequency resource, a priority level, a transmit and receive beam grouping indication, or a cross link interference test signal type.

* * * * *